March 26, 1968   H. C. SHAW   3,375,206
CHEMICAL REACTION CATALYST AND ITS PREPARATION
Filed Sept. 9, 1964
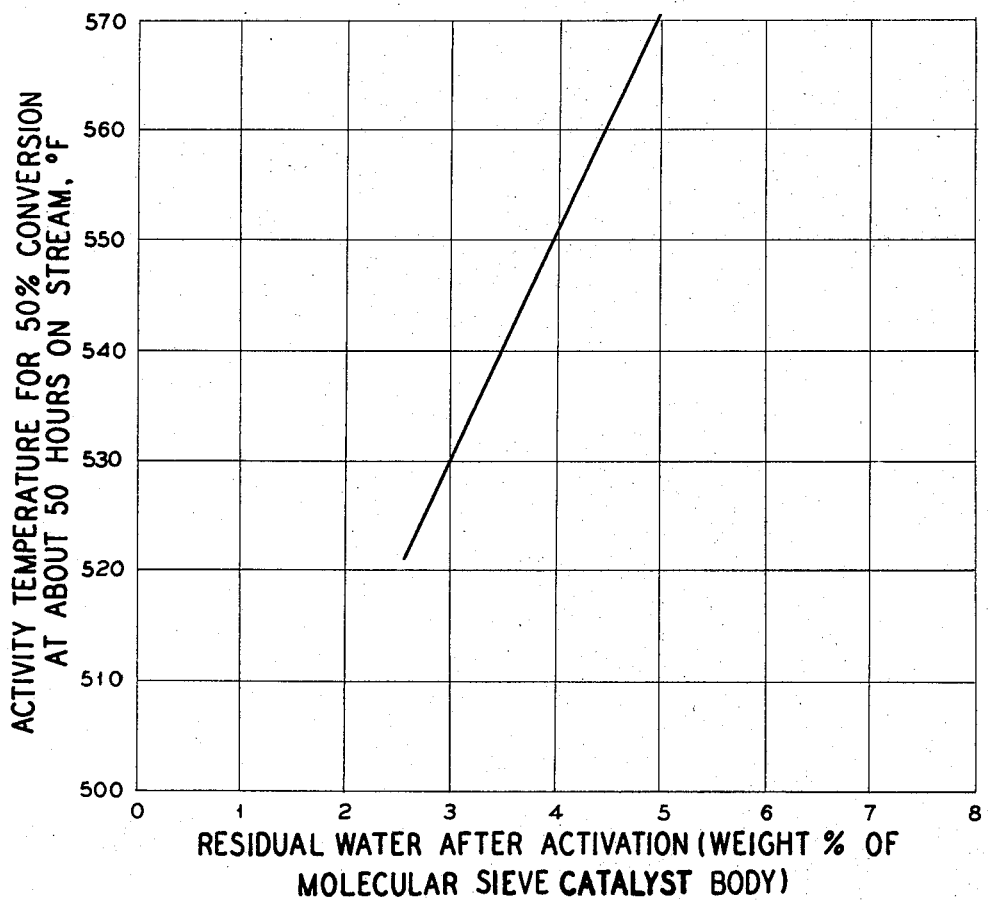
INVENTOR.
HERBERT C. SHAW
BY John C. LeFever
ATTORNEY United States Patent Office 3,375,206
Patented Mar. 26, 1968

3,375,206
CHEMICAL REACTION CATALYST AND
ITS PREPARATION
Herbert C. Shaw, Kenmore, N.Y., assignor to Union
Carbide Corporation, a corporation of New York
Filed Sept. 9, 1964, Ser. No. 395,221
21 Claims. (Cl. 252—455)

ABSTRACT OF THE DISCLOSURE

Molecular sieve chemical reaction catalyst bodies are prepared by providing a three-dimensional crystalline alumino-silicate containing water of hydration, having a $SiO_2/Al_2O_3$ greater than 3 and pores sufficiently large to accept benzene. The hydrated material is compacted into dense uniformly shaped bodies and thereafter heated to above 250° C. and below the crystalline destruction point for sufficient duration to leave only 2–3 percent by weight of the activated molecular sieve as residual water.

---

This invention relates to an improved chemical reaction catalyst and preparation thereof, the catalyst being of the crystalline zeolitic molecular sieve type.

The novel compound of this invention is suitable for catalyzing many organic reactions, as for example, the hydrogenation of aldehydes to alcohols or ketones. It is particularly suitable as a hydrocarbon conversion catalyst. As used herein, the expressions "hydrocarbon conversion" and "upgrading" include but are not limited to processes for cracking, hydrocracking, polymerization, alkylation, reforming, hydroforming, isomerizing, aromatizing, hydrogenating, dehydrogenating, and dehydrocyclization.

The present novel compound is also suitable for catalyzing certain inorganic reactions, as for example, the decomposition of hydrogen peroxide, the ortho-to-para hydrogen conversion and the hydrogen-deuterium exchange.

Crystalline zeolitic molecular sieves, both with and without a catalytically active metal inside the sieve cagework, have been found highly satisfactory hydrocarbon conversion catalysts. The molecular sieves having a silica-to-alumina molar ratio greater than 3 and uniformly sized pores sufficiently large to accept benzene are particularly effective, these materials including the naturally occurring faujasite and the synthetic zeolites L and Y. They are characterized by internal surfaces which are accessible through interconnecting channels of molecular dimensions. Ionic charges or fields in the internal surfaces activate many organic reactions, and it is known to modify these internal surfaces and the activity of the catalysts for certain reactions by cation exchange, decationization and/or loading with active metals.

In order that the crystalline zeolite catalysts may be employed in fixed-, fluid- or moving-bed processes without engendering excessive pressure drop in such processes, it is known to compact them into larger bodies. For example, this has been done quite satisfactorily by the well-known technique of tableting, whereby the crystalline zeolite powder is compacted into a die to make cylinder-form tablets. Additives such as graphite are generally mixed with the zeolite powder in amounts up to a few weight percent to serve as a lubricant in the tableting operation. The compacted molecular sieve catalyst bodies must be physically strong to withstand the weight load of being packed into reaction vessels in relatively thick beds. In addition to such crushing forces the catalyst bodies must withstand high internal stresses which accompany hydration of the molecular sieve zeolite. Prior to use as a catalyst the molecular sieve bodies are activated at elevated temperatures above about 250° C. and below the crystalline destruction point to remove the water of hydration thereby leaving an extremely large internal adsorption region. However, when used as a catalyst the molecular sieve quickly becomes rehydrated whenever exposed to moisture. This may happen accidentally in service or will occur when the catalyst is periodically reactivated by oxidative burn-off of reaction residues of high carbon content, i.e., coke. When an activated crystalline zeolite adsorbs water a large amount of heat is liberated imposing thermal stresses and the zeolite crystal lattice actually changes dimension reversibly as it is hydrated and dehydrated.

It has been found that activated molecular sieve catalyst bodies become fragmented upon rehydration; in one instance the break-up was so severe that only 12% of the withdrawn catalyst (originally about 6 mesh in the form of $\frac{1}{8}'' \times \frac{1}{8}''$ tablets) was larger than 8 mesh. As previously indicated, break-up or decrepitation of the compacted molecular sieve catalyst bodies creates excessive pressure drop and also prohibitively high stack losses of catalyst dust.

An object of this invention is to provide an improved compacted molecular sieve catalyst body. Another object is to provide an improved molecular sieve catalyst body of high strength and resistance to decrepitation on hydration. Still another object is to provide an improved method for preparing such compacted molecular sieve catalyst bodies which is reproducible and suitable for large scale manufacturing.

These and other objects are achieved by the present invention which may be broadly described as a method for preparing improved molecular sieve chemical reaction catalyst bodies comprising, first providing three-dimensional crystalline aluminosilicate zeolite material containing water of hydration, having a silicate-to-alumina ratio of greater than 3 and uniformly sized pores sufficiently large to accept benzene. The hydrated crystalline zeolite is dried at temperature of about 25–150° C., pulverized and compacted into dense, uniformly shaped bodies and thereafter heated at temperature above about 250° C. and below the crystalline destruction point. The heating is continued for sufficient duration to remove most of the water but leaving between about 2 and 3 percent by weight of the resulting activated molecular sieve as residual water.

Heretofore it has been the practice to heat activate molecular sieve catalysts in a manner so as to remove virtually all of the water thereby maximizing the volume of the inner adsorption region. However, it has been unexpectedly discovered that improved molecular sieve chemical reaction catalyst bodies may be prepared by controlling the activation of certain bodies to remove most of the water of hydration but leaving between about 2 and 3 percent by weight of the activated molecular sieve as residual water. After activation the catalyst bodies are placed in service, or stored in sealed containers until needed. Even if the thus-activated catalyst bodies become rehydrated after the initial activation, they may be reactivated without deleterious effects on physical properties and/or catalytic activity.

This invention is particularly surprising in view of the recognition that catalytic activity of compacted molecular sieve bodies decreases with increasing residual moisture after activation. This phenomenon is illustrated by the single figure which is a graph showing the relationship between activity temperature for 50% conversion of a gas oil feed stock distilling above 400° F. to products in the gasoline boiling range distilling below 400° F. at about 50 hours on-stream time as the ordinate, against the residual moisture remaining after activation of the catalyst. The latter was compacted pellets of magnesium exchanged, decationized zeolite Y containing 0.5 wt.

percent palladium in the inner adsorption region. The figure shows that activity temperature changes about 20° F. for each 1 wt. percent residual water.

A residual moisture content of 2–3 wt. percent provides adequately high catalytic activity and extremely high crack resistance on rehydration for certain embodiments. For maximum catalytic activity it is desirable to have as low residual water content as possible, but it will be subsequently demonstrated that the residual water content must be at least 2 wt. percent for high crack resistance.

The full utilization of the catalytic activity of the present molecular sieve chemical reaction catalyst bodies requires diffusion of the reactants and products through passages between the self-bonded zeolite crystals as well as into and out of the molecular-sized pores of the crystals themselves. When such self-bonding zeolite bodies are compacted so as to be physically strong they often become diffusion limited. This difficulty may be overcome by incorporating about 10 to 30 weight percent inert diluent powder with the zeolite catalyst powder and thoroughly mixing same to provide a uniform composite which is then compacted into dense uniformly shaped bodies. The bodies are then controllably activated at elevated temperature in the previously described manner. Suitable inert diluents include silica, aluminum silicate, alumina trihydrate, and montmorillonite. It will be appreciated that the inert diluent may itself contain a catalytically active agent such as elemental palladium. The use of an inert diluent in the aforedescribed manner is preferred in the practice of this invention.

The molecular sieve catalyst bodies are preferably decationized for improved activity, that is, at least 10% of the aluminum atoms of the aluminosilicate structure are not associated with any cations. Another way of expressing decationization is the condition whereby less than 90 percent of the aluminum atoms of the aluminosilicate structure are associated with cations. Decationization may be accomplished by ion-exchanging the alkali metal cations of the crystalline zeolite with non-metal cations as, for example, ammonium ions or other easily decomposable cations such as methyl or other substituted quaternary ammonium ions, and then heating the non-metal cation exchanged crystalline zeolite to temperatures of between about 350° C. and about 600° C. While ammonium ion exchange is the preferred method of introducing non-metal cations into the molecular sieve structure for subsequent decationization, this may also be accomplished by acid washing or to a limited extent by water leaching to introduce hydrogen ions. The principal disadvantage of the acid washing method is that many molecular sieve zeolites are less stable in strongly acid mediums than in neutral or basic media. Decationization is described more completely in U.S.P. 3,120,006, issued Apr. 21, 1964 to J. A. Rabo, et al.

The activity of molecular sieve catalyst bodies for certain reactions is often enhanced by the inclusion of less than about 2 weight percent of a catalytically active metal, preferably loaded or deposited in the internal adsorption region of the zeolite in a highly dispersed state. In this form the metal has an extremely high surface for contact with the chemical reactant. The catalytically active metals may be dispersed upon the molecular sieve in their elemental state or as oxides or compounds such as sulfides having catalytic properties. Among the metals and their oxides which have hydrocarbon conversion activity are copper, silver, gold, zinc, cadmium, titanium, tin, lead, vanadium, antimony, bismuth, chromium, molybdenum, tungsten, manganese, rhenium, iron, cobalt, nickel and the noble metals of the palladium and platinum groups. The preferred metals are platinum and palladium in quantity of between about 0.2 and 2.0 wt. percent of the activated molecular sieve.

The catalytically active metal may be introduced to the crystalline aluminosilicate by any of several methods. Among the suitable methods are (1) impregnation using an aqueous solution of a suitable metal compound followed by drying and thermal or chemical decomposition of the metal compound as described in Gladrow et al., U.S.P. 2,971,904; (2) adsorption of a fluid decomposable compound of the metal followed by thermal or chemical decomposition of the metal compound as described in Castor et al., U.S.P. 3,013,987; (3) cation exchange using an aqueous solution of a suitable metal salt followed by chemical reduction of the cations as described in Breck et al., U.S.P. 3,013,982; (4) cation exchange using an aqueous solution of a suitable metal compound in which the metal is in the cationic state with coordination complexing agents followed by thermal or chemical decomposition of the cationic complex. Method 4 is described in copending application Ser. No. 762,952, filed Sept. 24, 1958, U.S.P. 3,200,082 in the names of D. W. Breck and S. W. Bukata, and incorporated herein to the extent pertinent.

Methods 1, 2 and 3 are conveniently employed to introduce metals such as copper, silver, gold, cadmium, iron, cobalt and nickel while Methods 1, 2 and 4 are suitable for introducing the platinum and palladium group metals. Method 2 is suitable for introducing metals such as titanium, chromium, molybdenum, tungsten, rhenium, manganese, zinc and vanadium. The metal loading techniques of Methods 2, 3 and 4 are preferred, as the resulting products exhibit higher catalytic activity than those produced by Method 1. The ion exchange techniques of Methods 3 and 4 are particularly advantageous since their products have exhibited the highest catalytic activities. Methods 2, 3 and 4 are preferred because of the deposition of the active metal throughout the inner adsorption area of the molecular sieve, the most active dispersion being achieved by Methods 3 and 4.

Another method of increasing the catalytic activity of certain molecular sieves is by ion-exchanging a substantial part of the monovalent cations of the zeolite structure for polyvalent cations, as for example, using water soluble salts of the polyvalent materials. This procedure does not affect crystallinity and is quite effective in improving the catalytic activity of molecular sieves having silica-to-alumina ratios above 3. In a preferred embodiment of this invention the molecular sieve is polyvalent cation exchanged and for best results it is both decationized and polyvalent cation exchanged. The polyvalent metal cations of the catalyst may be a mixture of two or more different cations to enhance the catalytic activity. The alkaline earth metals are especially suitable, that is, beryllium, magnesium, calcium, strontium and barium, magnesium being preferred. Other suitable polyvalent metal cations include rare earth elements such as cerium as well as chromium, manganese and zinc.

The molecular sieves useful in the present invention must have a silica-to-alumina ratio of greater than 3, for a number of reasons. For example, these zeolites may be decationized to virtually any desired extent without loss of crystallinity and uniformity of their pore openings. This is important because the crystallinity of the zeolite strongly influences catalytic activity; zeolite catalysts having crystalline structures are more active than the non-crystalline zeolites with the same chemical composition. At the preferred degrees of decationization, i.e., at least 40% and preferably above 65%, the low silica-to-alumina ratio molecular sieves such as zeolite X (described in U.S.P. 2,882,244), lose their crystallinity. Also, molecular sieves of silica-to-alumina ratio greater than 3 have higher heat stability than sieves of lower ratios.

Another requirement of suitable molecular sieves is pores sufficiently large to receive benzene. For effective use as a catalyst, the reactants must be able to pass through the uniform sized pores for intimate contact with the inner cagework of the molecular sieve which has an adsorption area about one hundred times as large as the external surface area. The pores must also be sufficiently large to permit outflow of the catalyzed reaction products.

Many of the reactants to be catalyzed and the products have relatively large critical dimensions, e.g., hydrocarbons to be upgraded. These materials are too large to pass through the relatively small pored molecular sieves, e.g., zeolite A, but can pass freely into the crystalline zeolites having pores sufficiently large to reecive benzene.

Zeolite Y is the preferred molecular sieve in the practice of this invention, having a chemical formula in terms of mole oxides as follows:

$$0.9 \pm 0.2 Na_2O:Al_2O_3:WSiO_2:XH_2O$$

wherein W is a value greater than 3 up to about 6 and X may be a value up to about 9.

Zeolite Y has a characteristic X-ray powder diffraction pattern which may be employed for identification. The preparation of zeolite Y is described in U.S. Patent No. 3,130,007, incorporated herein to the extent pertinent.

Zeolite L is another suitable molecular sieve for practicing this invention, and its composition may be stoichiometrically be expressed in terms of mole ratios of oxides. Thus, a general formula for zeolite L may be represented as follows:

$$1.0 \pm 0.1 M_{\frac{2}{n}}O:Al_2O_3 6.4 \pm 0.5 SiO_2:yH_2O$$

wherein M designates at least one exchangeable cation, as hereinbelow defined; n represents the valance of M; and y may be any value from 0 to about 7. Minor variations in the mole ratios of these oxides within the ranges indicated by the above formula do not significantly change the crystal structure or physical properties of the zeolite. Likewise, the value of y is not necessarily an invariant for all samples of zeolite L. This is true because various exchangeable cations are of different size, and as no appreciable modification of the crystal lattice dimensions of the zeolite is effected by the exchange of these particular cations, more or less interstitial space should be available for the accommodation of water molecule. The value of y therefore depends upon the identity of the exchangeable cation and also upon the degree of dehydration of the zeolite.

In making zeolite L, the usual method comprises dissolving potassium or sodium aluminate and alkali, viz., potassium or sodium hydroxide, in water. This solution is admixed with a water solution of sodium silicate, or preferably with a water-silicate mixture derived at least in part from an aqueous colloidal silica sol. The resultant reaction mixture is placed in a container made, for example, of metal or glass. The container should be closed to prevent loss of water. The reaction mixture is then stirred to insure homogeneity.

For best results, the crystallization procedure is carried out at a temperature of approximately 100° C. The zeolite may, however, be satisfactorily prepared at temperatures of from about 100° C. to about 120° C., the pressure being atmospheric or at least that corresponding to the vapor pressure of water in equilibrium with the mixture of reactants at the higher temperature.

In addition to composition, zeolite L may be identified and distinguished from other zeolites and other crystalline substances by its X-ray powder diffraction pattern, the data for which are set forth below in Tables A and B. In obtaining the X-ray powder diffraction patterns standard techniques were employed. The radiation was the K-alpha doublet of copper, and a Geiger counter spectrometer with a strip chart pen recorder was used. The peak heights, I, and the positions as a function of $2\theta$, where $\theta$ is the Bragg angle, were read from the spectrometer chart. From these the relative intensities, 100 $I/I_0$, where $I_0$ is the intensity of the strongest line or peak, and $d$ (A.) observed, the interplanar spacing in Angstrom units, corresponding to the recorded lines were determined.

X-ray powder diffraction data for samples of the potassium form of zeolite L prepared from a potassium aluminosilicate reaction mixture ($K_2L$) and from a potassium sodium aluminosilicate mixture (K-NaL) are given in Table A below:

TABLE A

| $2\theta$ | $d$ (A.) | 100 $I/I_0$ | |
|---|---|---|---|
| | | $K_2L$ | K-NaL |
| 5.6 | 15.8 | 100 | 100 |
| 11.2 | 7.89 | 14 | 6 |
| 11.8 | 7.49 | 15 | 14 |
| 14.8 | 5.98 | 25 | 16 |
| 15.4 | 5.75 | 11 | 6 |
| 19.4 | 4.57 | 32 | 30 |
| 20.2 | 4.39 | 13 | 13 |
| 20.5 | 4.33 | 13 | 19 |
| 22.7 | 2.91 | 30 | 35 |
| 23.4 | 3.78 | 13 | 13 |
| 24.3 | 3.66 | 19 | 18 |
| 25.6 | 3.48 | 23 | 21 |
| 27.3 | 3.26 | 14 | 23 |
| 28.1 | 3.17 | 34 | 48 |
| 29.1 | 3.07 | 22 | 27 |
| 29.6 | 3.02 | 15 | 14 |
| 30.7 | 2.91 | 23 | 27 |
| 33.8 | 2.65 | 19 | 18 |
| 34.2 | 2.62 | 8 | 16 |
| 35.5 | 2.53 | 8 | 6 |
| 36.6 | 2.45 | 9 | 10 |
| 27.1 | 2.42 | 11 | 10 |
| 41.2 | 2.19 | 11 | 10 |

The more significant $d$ (A.) values, i.e., interplanar spacings, for zeolite L are given below in Table B.

TABLE B 16.1±0.3
7.52±0.04
6.00±0.02
4.57±0.03
4.35±0.04
3.91±0.02
3.47±0.02
3.28±0.02
3.17±0.01
3.07±0.01
2.91±0.01
2.65±0.01
2.46±0.01
2.42±0.01
2.19±0.01

In a preferred embodiment, a method is provided for preparing improved zeolite Y chemical reaction catalyst bodies in which a crystalline zeolite Y having a silica-to-alumina ratio of between about 3.5 and 6 is contacted with an aqueous solution containing sufficient non-metal cations for ion exchange to provide a $M_2O/Al_2O_3$ molar value less than 0.8, where M is an alkali metal cation. The zeolite Y is then contacted with another aqueous solution containing sufficient polyvalent metal cations for ion-exchange so that at least 10% of the aluminum atoms become associated with the polyvalent metal cations. The zeolite is then dried, pulverized and compacted into dense uniformly shaped bodies. Thereafter the molecular sieve is heated to temperature above 350° C. and below the crystalline destruction point to decationize the molecular sieve so that at least 10% of the aluminum atoms are no longer associated with cations. The heating is for sufficient duration to remove most of the water of hydration but leaving between about 2 and 3 percent by weight of the activated molecular sieve as residual water.

The degree of back-exchange with polyvalent metal cations is preferably so that at least 25% of the aluminum atoms of the aluminosilicate anionic structure become satisfied by polyvalent cations, while over 70% polyvalent metal cation exchange does not further improve either catalytic activity or hydrolytic stability. The preferred range for polyvalent exchange is 35%–65%. As previously indicated, the crystalline zeolite is contacted with an aqueous solution containing sufficient non-metal cations for ion exchange to provide a $M_2O/Al_2O_3$ molar value less than 0.8 where M is an alkali metal cation. This molar value is preferably less than 0.6 and best results are obtained below 0.15. It has also been disclosed above that sufficient polyvalent metal cations should be provided to afford an end product having at least 10% of the aluminum atoms satisfied by polyvalent metal cations, and preferably at least 25%. The amount of decationization in the catalyst product is found by difference between these two figures. That is, if 15% of the aluminum atoms are associated with sodium cations and 25% of the aluminum atoms are associated with magnesium cations, then the catalyst is 100–40 or 60% decationized after the thermal step.

The particular sequence of first introducing the non-metal cations and then back-exchanging with polyvalent metal cations does not form part of this invention, but is described and claimed in copending application Ser. No. 241,494, filed Dec. 3, 1962, and now abandoned in the name of Paul E. Pickert. It should be recognized that in the present method, the sequence may be reversed although the above-described procedure is preferred.

The invention will be more clearly understood by a reading of the ensuing examples. All of the examples involved a zeolite Y which in certain cases was back-exchanged with magnesium cations, decationized, and had palladium in a highly dispersed state deposited in the inner adsorption region of the molecular sieve. The following is a typical preparation through the ammonium exchange, magnesium exchange and palladium introduction steps.

*Example 1a.—Preparation of sodium zeolite Y*

Sodium zeolite Y having a $SiO_2$ to $Al_2O_3$ ratio of about 5 was prepared by dissolving 9,722 grams of caustic soda containing 76 wt. percent $Na_2O$, and 3,746 grams of sodium aluminate containing 46.5 wt. percent $Al_2O_3$ and 30.4 wt. percent $Na_2O$, in 47,632 grams of water. While agitating this solution at room temperature, 68,900 grams of an aqueous colloidal silica sol containing 30.0 wt. percent $SiO_2$ was added. To be reactant, the mixture was allowed to stand at room temperature for 28 hours, then pumped through a heater raising the temperature to 180°–200° F., and maintained at 200° F. in a crystallization tank for 48 hours. Zeolite Y was recovered by filtration, water washing and drying at about 220° F. yielding approximately 12 pounds of product.

*Example 1b.—Ammonium ion-exchange of sodium zeolite Y*

Into a 50 gallon tank with a stirrer, were charged 32 gallons of distilled water and 101 pounds of the sodium zeolite Y having a $SiO_2/Al_2O_3$ ratio of 4.92, a $Na_2O/Al_2O_3$ ratio of 0.95 and containing 45.5 wt. percent water. While stirring, 68 pounds of $NH_4Cl$ was added and the temperature raised to about 100° C. and maintained for 1 hour. The zeolite was recovered by filtration and washed with a total of 485 gallons of distilled water while on the filter. The filter cake was then reslurried in 32 gallons of distilled water with the addition of 18.5 pounds of fresh sodium zeolite Y from the same starting lot. The temperature of the slurry was raised to about 90° C. and then passed through a filter. While in the filter, a series of 9 additional ammonium ion-exchanges were performed in the following manner: At about 90° C., a solution of 68 pounds of $NH_4Cl$ in 35 gallons of distilled water was pumped through the filter followed by 110 gallons of distilled water wash followed by air expressing of the water.

Following the last ammonium exchange, washing on the filter was continued for 15 hours at a flow of 170 gallons per hour to thoroughly remove soluble chloride ions.

After removing the wash water by air pressure, 77 pounds of product having a 46.5 wt. percent loss on ignition at about 750° C. was recovered, considerable product having been lost through the filter.

The product analysis, on a sample dried at about 125° C. was:

|  | Weight percent | On an anhydrous basis, weight percent |
|---|---|---|
| $(NH_4)_2O$ | 8.2 | 9.7 |
| $Na_2O$ | 1.7 | 2.0 |
| $SiO_2$ | 55.5 | 65.4 |
| $Al_2O_3$ | 19.6 | 23.1 |
| Loss on ignition | 23.3 | |

*Example 1c.—Polyvalent cation exchange with $Mg^{+2}$ of ammonium zeolite Y*

Any ionizable magnesium salt may be used as a source of $Mg^{+2}$ for polyvalent cation exchange, magnesium sulfate being preferred because of its low cost.

Into a 55 gallon tank equipped with a stirrer were charged 30 gallons of distilled water, 75 pounds of the product from Example 1b and 24 pounds of product from a second preparation substantially identical to that from Example 1b for a total of 99 pounds. The water content of this mixture was 43%.

The analysis of the second preparation was:

|  | Weight percent | Anhydrous basis, weight percent |
|---|---|---|
| $(NH_4)_2O$ | 8.4 | 9.7 |
| $Na_2O$ | 1.2 | 1.4 |
| $SiO_2$ | 56.5 | 65.3 |
| $Al_2O_3$ | 20.4 | 23.6 |
| Loss on ignition | 21.9 | |

While stirring and heating 100 pounds of Epsom salts ($MgSO_4 \cdot 7H_2O$) was added. The mixture was heated to about 100° C., maintained at this level for about 1 hour, and then transferred to a filter. The filter cake was washed for about 6 hours at 100 gallons of distilled water per hour at a temperature of about 85° C. The wash water was removed by air pressure and the air flow through this filter continued for about 15 hours to partly dry the product. A total weight of 96.25 pounds, including 42.7% water, was recovered.

A sample of this product, dried at 100° C. for 30 minutes, was analyzed as follows:

|  | Weight percent | Anhydrous, weight percent |
|---|---|---|
| $(NH_4)_2O$ | 4.2 | 5.4 |
| MgO | 2.5 | 3.2 |
| $Na_2O$ | 1.4 | 1.8 |
| $SiO_2$ | 51.2 | 65.6 |
| $Al_2O_3$ | 18.1 | 23.2 |
| Loss on ignition | 26.2 | |

The analytical composition of the product on a molar basis was as follows:

0.46 $(NH_4)_2O$; 0.35 MgO: 0.13 $Na_2O$; $Al_2O_3$; 4.82 $SiO_2$

*Example 1d.—Pd loading of the above material*

The entire product, less samples, from Example 1c was slurried in 31.4 gallons of distilled water. To this slurry was added 11 gallons of a water solution of $Pd(NH_3)_4Cl_2$ containing 119 grams of palladium over a 2¾ hour interval. Stirring was continued for about 20 hours at about room temperature.

The slurry was filtered and washed on the filter with 510 gallons of distilled water, and air expressed overnight. The filter product weighed 93 pounds and had an LOI (loss on ignition) of 45%. A sample was submitted for analysis with the following results:

|  | Weight percent | Anhydrous basis, weight percent |
|---|---|---|
| $(NH_4)_2O$ | 4.3 | 5.4 |
| MgO | 2.7 | 3.4 |
| $Na_2O$ | 1.5 | 1.9 |
| $SiO_2$ | 52.3 | 65.3 |
| $Al_2O_3$ | 18.3 | 22.8 |
| Loss on ignition | 24.2 | |
| Pd | | [1] 0.55 |

[1] By X-ray fluorescence.

*Example 2.—Crack resistance of $Mg^{+2}$ zeolite Y vs. residual water content*

Magnesium cationic zeolite Y was dried and pulverized for the compacting step. It was not subjected to any of the final activation treatments required to effect decationization or elemental metal loading although it had been exchanged with $NH_4Cl$ and $Pd(NH_3)_4Cl_2$, as described above. Such activations are preferably done after the compact bodies have been formed for the reason that the development of the best combination of pellet strength and catalytic activity is dependent upon proper control of the activation treatment, as discussed hereinabove.

About 1% by weight graphite was added to the zeolite Y powder as a lubricant for the compacting operation, and the mixture was compacted into a die to make cylinder-form tablets about ⅛" diameter x ⅛" long using a commercial tableting machine. The tablets were placed in an electric oven which was progressively heated from 20° C. to 550° C. and continuously purged with normal air directly from the atmosphere at about 300 c.f.h. Sample tablets were withdrawn from the oven when it reached certain temperatures. After reaching 550° C. (Sample 7) the oven was allowed to cool to 310° C., so that Sample 8 was exposed to the entire sequence of heating. During this heating the zeolite Y was simultaneously activated, decationized, and $NH_3$ was lost from the palladium complex cation. The residual moisture was determined in this and the succeeding Examples 3-7 by heating the sample tablets for one hour at 850–1000° C. and measuring the loss of weight, taking into account the combustible graphite lubricant. To determine crack resistance, the tablets were rehydrated by placing in liquid water for about 5 minutes (until the evolution of bubbles stopped), removed, allowed to dry and then inspected for cracks. Cracks are defined as radial cracks across ends or longitudinal cracks along sides that are visible with a 40-power microscope. The results are summarized as follows:

| Sample Number | Time in Oven, Min. | Final Oven Temp. (° C.) | Residual $H_2O$ (weight percent) | $H_2O$ Hydration Cracked Tablets/ Tablets Inspected |
|---|---|---|---|---|
| 1 | 132 | 250 | 6.9 | 3/20 |
| 2 | 147 | 300 | 5.7 | 13/20 |
| 3 | 165 | 350 | 5.0 | 13/20 |
| 4 | 192 | 400 | 3.6 | 12/20 |
| 5 | 220 | 450 | 3.0 | 2/20 |
| 6 | 230 | 500 | 1.8 | 20/20 |
| 7 | 232 | 550 | 1.5 | 20/20 |
| 8 | 255 | 310 | 1.3 | 20/20 |

It is apparent from an examination of the above data that the crack resistance of Sample 5, having a residual water content of 3.0 wt. percent was far greater than Samples 4 ($H_2O$=3.6 wt. percent) and 6 ($H_2O$=1.8 wt. percent).

*Example 3.—Effect of moisture in activating gas*

In this experiment two groups of the same tablets as used in Example 2 were activated at two different temperatures and in different air purge atmospheres. All of the tablets were first dried in the same electric oven at 500° F. for 4 hours, including heat-up. The first group of tablets was activated at 550° C. for 4 hours including heat-up using a dry air purge through the oven of about 300 c.f.h. The second group was activated at 800° F. for 4 hours including heat-up, but with a purge of normal air. The first group had 0.0–0.4 wt. percent residual moisture and of 25 tablets inspected, all cracked on water hydration. In contrast the second group had 2.8–3.3 wt. percent residual moisture and none of the inspected 25 tablets cracked on water hydration. This test demonstrates the importance of the activating atmosphere's moisture content in practicing the invention; relatively higher temperatures may be employed as long as the atmosphere is not substantially dehydrated.

*Example 4.—Crack resistance of catalyst with diluent*

In this experiment the tablets included about 20% by weight alumina trihydrate as an inert diluent. The tablets were prepared by first slurring $Al_2O_3 \cdot 3H_2O$ in distilled water and dissolving $PdCl_2$ in concentrated hydrochloric acid followed by dilution with distilled water. The $PdCl_2$ solution was slowly added to the alumina slurry followed by addition of the $Mg(NH_4)$ zeolite Y. The resulting slurry mixture was filtered in a press and blown dry. The powder was granulated, dried, a lubricant added, and the powder mixture tabletted. The activation procedure was similar to Example 2, the tablets being placed in the electric oven which was progressively heated from 20° C. to 550° C. and continuously purged with normal air at about 300 c.f.h. The results are summarized as follows:

| Sample Number | Time in Oven, Min. | Final Oven Temp. (° C.) | Residual $H_2O$ (weight percent) | $H_2O$ Hydration Cracked Tablets/ Tablets Inspected |
|---|---|---|---|---|
| 1 | 132 | 250 | 10.1 | 0/20 |
| 2 | 147 | 300 | 8.2 | 0/20 |
| 3 | 165 | 350 | 6.8 | 0/20 |
| 4 | 192 | 400 | 4.9 | 0/20 |
| 5 | 208 | 450 | 3.1 | 0/20 |
| 6 | 220 | 500 | 2.1 | 0/20 |
| 7 | 230 | 550 | 1.8 | 3/20 |

It will be apparent from this data that appreciable hydration cracking was not experienced as long as the residual water content after activation was above about 2 wt. percent. However, as previously discussed and illustrated in the figure, the catalytic activity decreases with increasing residual water, and the $H_2O$ content must be below about 3 wt. percent even though compact catalyst bodies containing more water are satisfactory from the standpoint of crack strength in hydration.

*Example 5.—Crack resistance of catalyst with diluent at low residual water content*

Tablets containing 20% by weight alumina trihydrate as an inert diluent were first dried at 250° C. for 4 hours including heat-up time, and then activated at 550° C. for 4 hours. The electric oven was purged by normal air at a flow rate of about 300 c.f.h. for the first 4 hours and then purged with dried air for the last 4 hours. The following results were obtained:

| Sample Number | Average Crush Strength (lbs.) | Piece Density (g./cc.) | Residual $H_2O$ (weight percent) | $H_2O$ Hydration Cracked Tablets/ Inspected Tablets |
|---|---|---|---|---|
| 1 | 21.9 | 0.89 | 0.9 | 24/25 |
| 2 | 22.7 | 0.90 | 0.9 | 25/25 |
| 3 | 20.3 | 0.96 | 0.6 | 25/25 |
| 4 | 29.3 | 1.03 | 0.9 | 19/25 |

This data confirms the Example 4 tests as demonstrating that compact catalyst bodies containing an inert diluent are badly cracked on hydration.

*Example 6.—Different activation conditions*

In this experiment a 1 lb. quantity of 20 wt. percent alumina trihydrate-containing tablets was first heated to 250° C. in 2 hours and held at 250° C. for 2 hours. The tablets were then heated to 480° C. in 1½ hours and after 1 hour at this temperature the first sample was removed. A second sample was taken 15 minutes later, i.e., after 1¼ hours at 480° C. The oven was purged with 30 c.f.h. of normal air (2–3° F. dew point) during the entire drying-activation sequence. The results were as follows:

| Sample Number | Residual $H_2O$ (weight percent) | $H_2O$ Hydration Cracked Tablets/ Tablets Inspected |
|---|---|---|
| 1 | 2.3 | 0/25 |
| 2 | 1.9 | 4/25 |

This data demonstrates the critical nature of activation and the need for careful controlling of activation conditions. In this instance a mere additional 15 minutes of activation resulted in a compacted catalyst body having substantially lower hydration crack strength.

*Example 7*

Another series of experiments were performed with tablets containing 20 weight percent alumina trihydrate as an inert diluent. The samples, approximately one pound each, were spread in a layer about ½-inch thick in a wire mesh basket and heated in the electric oven with normal atmospheric air. Shatter resistance was measured after the following treatments:

(1) After immersion of the activated catalysts in liquid water.

(2) Sample from (1) after standing in air about 24 hours.

The catalyst testing reactor consisted of a 4-foot long by 1-inch diameter stainless steel tube with a thermocouple well located axially in the center of the tube. The reactor was surrounded by 6-inch thick aluminum blocks which were heated by a furnace. Temperatures and pressures were automatically controlled. The catalyst bed, approximately 16 inches long, which consisted of 55 cc.'s of ⅛-inch diameter x ⅛-inch long tablets of the catalyst uniformly diluted with 200 cc.'s of 4 x 6 mesh quartz chips, was supported in the center of the reactor by a postheat section of ⅛-inch stainless steel balls. The preheat section, which filled the rest of the reactor, was also ⅛-inch stainless steel balls. The temperature gradients in the catalyst bed were less than 5° F.

Hydrocarbon feed and electrolytic grade hydrogen were mixed in a mixing chamber before entering the reactor. A $H_2$ to feed ratio of 8,500 s.c.f./bbl. feed and reaction pressure of 1000 p.s.i.g. were employed. The properties of the feed were as follows:

| | |
|---|---|
| Aromatics, vol. percent | 27 |
| Olefins, vol. percent | 1 |
| Saturates, vol. percent | 72 |
| Sulfur, p.p.m. | 11 |
| Nitrogen, wt. percent | 0.00006 |
| Water, p.p.m. | 40 |
| Gravity, API° at 60° F. | 33.0 |
| ASTM distillation: Vol. percent | ° F. |
| Initial boiling point | 429 |
| 10 | 492 |
| 30 | 519 |
| 50 | 559 |
| 70 | 621 |
| 90 | 716 |
| 95 | 758 |
| End boiling point | 831 |

The calcined catalyst, 50 cc.'s, was uniformly mixed with 200 cc.'s of 4 x 6 mesh quartz chips, was charged to the reactor and heated to 750° F. in a purge of $N_2$ of 5.4 s.c.f./hr. The reactor was pressurized to 1000 p.s.i.g. with $H_2$ and held at 750° F. for 1-2 hours. The $H_2$ flow during this period was the same as used when the feed was introduced. The temperature was lowered to about 530° F. and the feed introduced at a volume-hourly-space-velocity of 1.5, i.e., vol. feed/vol. catalyst/hr. Temperature was then adjusted to give a constant 50–55% conversion of the feed. Conversion was defined as 100 minus the volume of the 400° F.+ product based on the volume of fresh feed.

TABLE C.—EFFECT OF ACTIVATION CONDITIONS ON HYDRATION CRACK RESISTANCE AND CATALYTIC ACTIVITY

| Sample Number | Drying and Activation Procedure | Residual $H_2O$ (weight percent) | Crack Resistance* | | Activity, ° F. | | |
|---|---|---|---|---|---|---|---|
| | | | 1 | 2 | 25 hrs. | 50 hrs. | 75 hrs. |
| 1 | 3.5 hrs. at 425° F., 3.5 hrs. at 1,050° F. with dry air purge. | 0.9 | 12 | 10 | 518 | 519 | 521 |
| 2 | 2 hrs. to 450° F. in dry air purge, 2 hrs. at 450° F. in dry air purge, 2 hrs. to 900° F. in dry air purge, 2 hrs. at 900° F. in dry air purge, +15 min. in ambient air purge. | 2.3 | 1 | 5 | 525 | 526 | |
| 3 | Same as Sample No. 2 but without 15 min. in ambient air. | 2.4 | 2 | 6 | 523 | 524 | 524 |
| 4 | 2 hrs. to 450° F. ambient air purge, 2 hrs. at 450° F. ambient air purge, 2 hrs. to 750° F. ambient air purge, 2 hrs. at 750° F. ambient air purge. | 3.1 | 0 | 2 | 538 | 542 | 544 |

*The number of cracked tablets of the twenty-five inspected.

The results of these experiments are summarized in Table C. Sample 1 having the lowest residual water content (0.9 wt. percent $H_2O$) was the most active catalyst but had unsatisfactory hydration crack resistance. Samples 2 and 3 with residual water contents between 2 and 3 wt. percent provided optimal balance between crack resistance and catalytic activity. It can be seen from Sample 4 that with residual water content just slightly greater than 3.0 wt. percent, catalytic activity is substantially reduced and 15–20° F. higher temperatures are required for 50% conversion of the feed stock.

Although particular embodiments of this invention have been described in detail, it is contemplated that modifications may be made and that some features may be employed without others, all within the scope of the invention.

What is claimed is:

1. A method for preparing improved molecular sieve chemical reaction catalyst bodies comprising the steps of:
   (a) providing three-dimensional crystalline aluminosilicate zeolite material containing greater than about 3 weight percent water of hydration, having a silica-to-alumina ratio of greater than 3 and uniformly sized pores sufficiently large to accept benzene,
   (b) compacting the hydrated crystalline zeolite into dense, uniformly shaped bodies, and
   (c) thereafter heating the hydrated shaped crystalline zeolite bodies at temperature above about 250° C. and below the crystalline destruction point for sufficient duration to remove most of the water but leaving between about 2 and 3 percent by weight of the activated molecular sieve as residual water.

2. A method for preparing improved molecular sieve chemical reaction catalyst bodies comprising the steps of:
   (a) providing three-dimensional crystalline aluminosilicate zeolite material containing greater than about 3 weight percent water of hydration, having a silica-to-alumina ratio of greater than 3 and uniformly sized pores sufficiently large to accept benzene,
   (b) adding about 10 to 30 weight percent inert diluent to the hydrated crystalline zeolite and intimately mixing same to provide a uniform composite,
   (c) compacting the hydrated crystalline zeolite-inert diluent composite into dense uniformly shaped bodies, and
   (d) thereafter heating the hydrated bodies at temperature above about 250° C. and below the crystalline destruction point for sufficient duration to remove most of the water but leaving between about 2 and 3 percent by weight of the activated molecular sieve as residual water.

3. A method for preparing improved molecular sieve chemical reaction catalyst bodies comprising the steps of:
  (a) providing three-dimensional crystalline aluminosilicate zeolite material having a silica-to-alumina ratio of greater than 3 and uniformly sized pores sufficiently large to accept benzene,
  (b) contacting the crystalline zeolite with an aqueous solution containing non-metal cations for ion exchange with the cations of said crystalline zeolite,
  (c) compacting the non-metal cation exchanged, hydrated crystalline zeolite into dense uniformly shaped bodies, and
  (d) thereafter heating the shaped crystalline zeolite bodies at temperature above 350° C. and below the crystalline destruction point for sufficient duration to both decationize the zeolite so that at least 10 percent of the aluminum atoms are no longer associated with cations, and remove most of the water but leaving between about 2 and 3 percent by weight of the resulting activated molecular sieve as residual water.

4. A method for preparing improved molecular sieve chemical reaction catalyst bodies comprising the steps of:
  (a) providing three-dimensional crystalline aluminosilicate zeolite material having a silica-to-alumina ratio of greater than 3 and uniformly sized pores sufficiently large to accept benzene,
  (b) contacting said crystalline zeolite with an aqueous solution containing sufficient polyvalent metal cations for ion-exchange so that at least 25 percent of the aluminum atoms become associated with said polyvalent cations,
  (c) compacting the polyvalent cation exchanged, hydrated crystalline zeolite into dense uniformly shaped bodies, and
  (d) thereafter heating the polyvalent metal cation exchange shaped crystalline zeolite bodies at temperature above about 250° C. and below the crystalline destruction point for sufficient duration to remove most of the water but leaving between about 2 and 3 percent by weight of the resulting activated molecular sieve as residual water.

5. A method for preparing improved molecular sieve chemical reaction catalyst bodies comprising the steps of:
  (a) providing three-dimensional crystalline aluminosilicate zeolite material having a silica-alumina ratio of greater than 3 and uniformly sized pores sufficiently large to accept benzene,
  (b) contacting the crystalline zeolite with an aqueous solution containing non-metal cations for ion exchange with the cations of said crystalline zeolite,
  (c) thereafter contacting the non-metal cation exchanged crystalline zeolite with an aqueous solution containing sufficient polyvalent metal cation for ion-exchange so that at least 10 percent of the aluminum atoms become associated with said polyvalent metal cations,
  (d) compacting the hydrated crystalline zeolite into dense uniformly shaped bodies, and
  (e) thereafter heating the shaped crystalline zeolite bodies at temperature above about 350° C. and below the crystalline destruction point for sufficient duration to both decationize the zeolite so that at least 10 percent of the aluminum atoms are no longer associated with cations, and remove most of the water but leaving between about 2 and 3 percent by weight of the resulting activated molecular seive as residual water.

6. A method for preparing improved molecular sieve chemical reaction catalyst bodies comprising the steps of:
  (a) providing three-dimensional crystalline aluminosilicate zeolite having a silica-to-alumina ratio of greater than 3 and uniformly sized pores sufficiently large to accept benzene,
  (b) contacting said crystalline zeolite with an aqueous solution containing sufficient polyvalent metal cations for ion-exchange so that at least 25 percent of the aluminum atoms become associated with said polyvalent cations,
  (c) adding about 10 to 30 weight percent inert diluent to the hydrated crystalline zeolite and intimately mixing same to provide a uniform composite,
  (d) compacting the hydrated crystalline zeolite-inert diluent composite into dense uniformly shaped bodies, and
  (e) thereafter heating the hydrated shaped crystalline zeolite-inert diluent bodies at temperature above about 250° C. and below the crystalline destruction point for sufficient duration to remove most of the water but leaving between about 2 and 3 percent by weight of the resulting activated molecular sieve as residual water.

7. A method for preparing improved molecular sieve chemical reaction catalyst bodies comprising the steps of:
  (a) providing three-dimensional crystalline aluminosilicate zeolite having a silica-to-alumina ratio of greater than 3 and uniformly sized pores sufficiently large to accept benzene,
  (b) adding about 10 to 30 weight percent inert diluent to the hydrated crystalline zeolite and intimately mixing same to provide a uniform composite,
  (c) contacting the crystalline zeolite with an aqueous solution containing non-metal cations for ion exchange with the cations of said crystalline zeolite,
  (d) compacting the non-metal cation exchanged, hydrated crystalline zeolite-inert diluent into dense uniformly shaped bodies, and
  (e) thereafter heating the hydrated shaped crystalline zeolite-inert diluent bodies at temperature above about 350° C. and below the crystalline destruction point for sufficient duration to both decationize the resulting molecular sieve so that at least 10 percent of the aluminum atoms are no longer associated with cations, and remove most of the water but leaving between about 2 and 3 percent by weight of the resulting activated molecular sieve as residual water.

8. A method for preparing improved molecular sieve chemical reaction catalyst bodies comprising the steps of:
  (a) providing three-dimensional crystalline aluminosilicate zeolite having a silica-to-alumina ratio of greater than 3 and uniformly sized pores sufficiently large to accept benzene,
  (b) contacting said crystalline zeolite with an aqueous solution containing sufficient non-metal cations for ion-exchange to provide a $M_2O/Al_2O_3$ molar value less than 0.8 where M is an alkali cation,
  (c) thereafter contacting the non-metal cation exchange molecular zeolite with an aqueous solution containing sufficient polyvalent metal cation for ion exchange so that at least 10 percent of the aluminum atoms become associated with said polyvalent metal cations,
  (d) adding between about 10 and 30 percent by weight of inert diluent and intimately mixing same with the crystalline zeolite so as to form a uniform composite,
  (e) compacting the hydrated crystalline zeolite-inert diluent into dense uniformly shaped bodies, and
  (f) thereafter heating the crystalline zeolite-inert diluent composite to temperature above 350° C. and below the crystalline destruction point to both decationize the molecular size so that at least 10 percent of the aluminum atoms are no longer associated with cations, and remove most of the water but leaving between 2 and 3 percent by weight of the resulting activated molecular sieve as residual water.

9. A method according to claim 1 in which the crystalline aluminosilicate is a member selected from the group consisting of faujasite, zeolite L and zeolite Y.

10. A method according to claim 1 in which the crystalline aluminosilicate is zeolite Y.

11. A method for preparing an improved hydrocarbon conversion catalyst comprising the steps of:
(a) providing a zeolite Y having a silica-to-alumina ratio of between about 3.5 and 6,
(b) contacting said zeolite Y with an aqueous solution containing sufficient ammonium cations for ion-exchange to provide a $M_2O/Al_2O_3$ molar ratio less than 0.15 where M is an alkali metal cation,
(c) thereafter contacting said zeolite Y with an aqueout solution containing sufficient magnesium cations for ion-exchange so that at least 25 percent of the aluminum atoms become associated with said magnesium cations,
(d) compacting the hydrated zeolite Y into dense uniformly shaped bodies,
(e) thereafter heating the zeolite Y bodies to temperature above 350° C. and below the crystalline destruction point to both decationize the molecular sieve so that at least 10 percent of the aluminum atoms are no longer associated with cations, and remove most of the water but leaving between 2 and 3 percent by weight of the resulting activated zeolite Y as residual water.

12. A method according to claim 1 in which a catalytically active metal is introduced inside the crystalline zeolite prior to compacting.

13. A method for preparing an improved hydrocarbon conversion catalyst comprising the steps of:
(a) providing a zeolite Y having a silica-to-alumina ratio of between about 3.5 and 6,
(b) contacting said zeolite Y with an aqueous solution containing sufficient ammonium cations for ion-exchange to provide a $M_2O/Al_2O_3$ molar ratio less than 0.15 where M is an alkali metal cation,
(c) thereafter contacting said zeolite Y with an aqueous solution containing sufficient magnesium cations for ion-exchange so that at least 25 percent of the aluminum atoms become associated with said magnesium cations,
(d) introducing 0.2 to 2.0 wt. percent of palladium inside the magnesium cationic molecular sieve in a highly dispersed state,
(e) compacting the magnesium cationic, palladium loaded zeolite Y into dense uniformly shaped bodies, and
(f) thereafter heating the zeolite Y to temperature above 350° C. and below the crystalline destruction point to both decationize said molecular sieve so that at least 10 percent of the aluminum atoms are no longer associated with cations, and remove most of the water but leaving between 2 and 3 percent by weight of the resulting molecular sieve as residual water.

14. An activated chemical reaction catalyst prepared by the process of claim 1.
15. An activated chemical reaction catalyst prepared by the process of claim 2.
16. An activated chemical reaction catalyst prepared by the process of claim 3.
17. An activated chemical reaction catalyst prepared by the process of claim 4.
18. An activated chemical reaction catalyst prepared by the process of claim 5.
19. An activated chemical reaction catalyst prepared by the process of claim 6.
20. An activated chemical reaction catalyst prepared by the process of claim 11.
21. An activated chemical reaction catalyst prepared by the process of claim 13.

References Cited

UNITED STATES PATENTS

| 2,882,243 | 4/1959 | Milton. | |
|---|---|---|---|
| 2,882,244 | 4/1959 | Milton. | |
| 2,973,327 | 3/1961 | Mitchell et al. | |
| 3,059,993 | 10/1962 | Barrer et al. | 23—112 |
| 3,236,762 | 2/1966 | Rabo et al. | 252—455 X |
| 3,239,471 | 3/1966 | Chen-Hu Chin | 252—455 |

FOREIGN PATENTS

| 620,028 | 5/1961 | Canada. |
|---|---|---|

DANIEL E. WYMAN, *Primary Examiner.*

C. F. DEES, *Assistant Examiner.*